United States Patent [19]
Baur et al.

[11] Patent Number: 6,063,353
[45] Date of Patent: May 16, 2000

[54] PROCESS FOR KRYPTON AN XENON EXTRACTION

[75] Inventors: Karl Baur, Baierbrunn; Michael Huala, Munich; Ralph Spori, Geretsried, all of Germany

[73] Assignee: Linde Aktiengesellschaft, Hollriegelskreuth, Germany

[21] Appl. No.: 09/034,383

[22] Filed: Mar. 4, 1998

[30] Foreign Application Priority Data

Mar. 4, 1997 [DE] Germany .......................... 197 08 780

[51] Int. Cl.[7] .................................................. C01B 23/00
[52] U.S. Cl. ........................................ 423/262; 423/240 R
[58] Field of Search ............................... 423/262, 240 R; 95/182, 183, 184

[56] References Cited

U.S. PATENT DOCUMENTS

| | | | |
|---|---|---|---|
| 4,078,907 | 3/1978 | Schlea | 95/173 |
| 4,844,715 | 7/1989 | Henrich et al. | 95/180 |
| 5,122,173 | 6/1992 | Agrawal et al. | 62/648 |
| 5,685,172 | 11/1997 | Darredeau et al. | 62/636 |
| 5,709,734 | 1/1998 | Scholz et al. | 95/131 |
| 5,792,523 | 8/1998 | McHugh, III | 428/34 |

FOREIGN PATENT DOCUMENTS

| | | | |
|---|---|---|---|
| 7-31877 | 2/1995 | Japan | 423/262 |
| 8-173748 | 7/1996 | Japan | 423/262 |

*Primary Examiner*—Ngoc-Yen Nguyen
*Attorney, Agent, or Firm*—Millen, White, Zelano & Branigan

[57] ABSTRACT

Krypton and/or xenon are extracted from a krypton-xenon concentrate by means of distillation, for example, a krypton-xenon concentrate obtained from a low-temperature air separation unit. To remove fluorine- and/or chlorine-containing contaminants, especially fluorocarbons, $CF_4$ and/or $SF_6$, the krypton-xenon concentrate, a krypton stream and/or a xenon stream are purified in a solid sorbent that contains phyllosilicates.

11 Claims, 1 Drawing Sheet

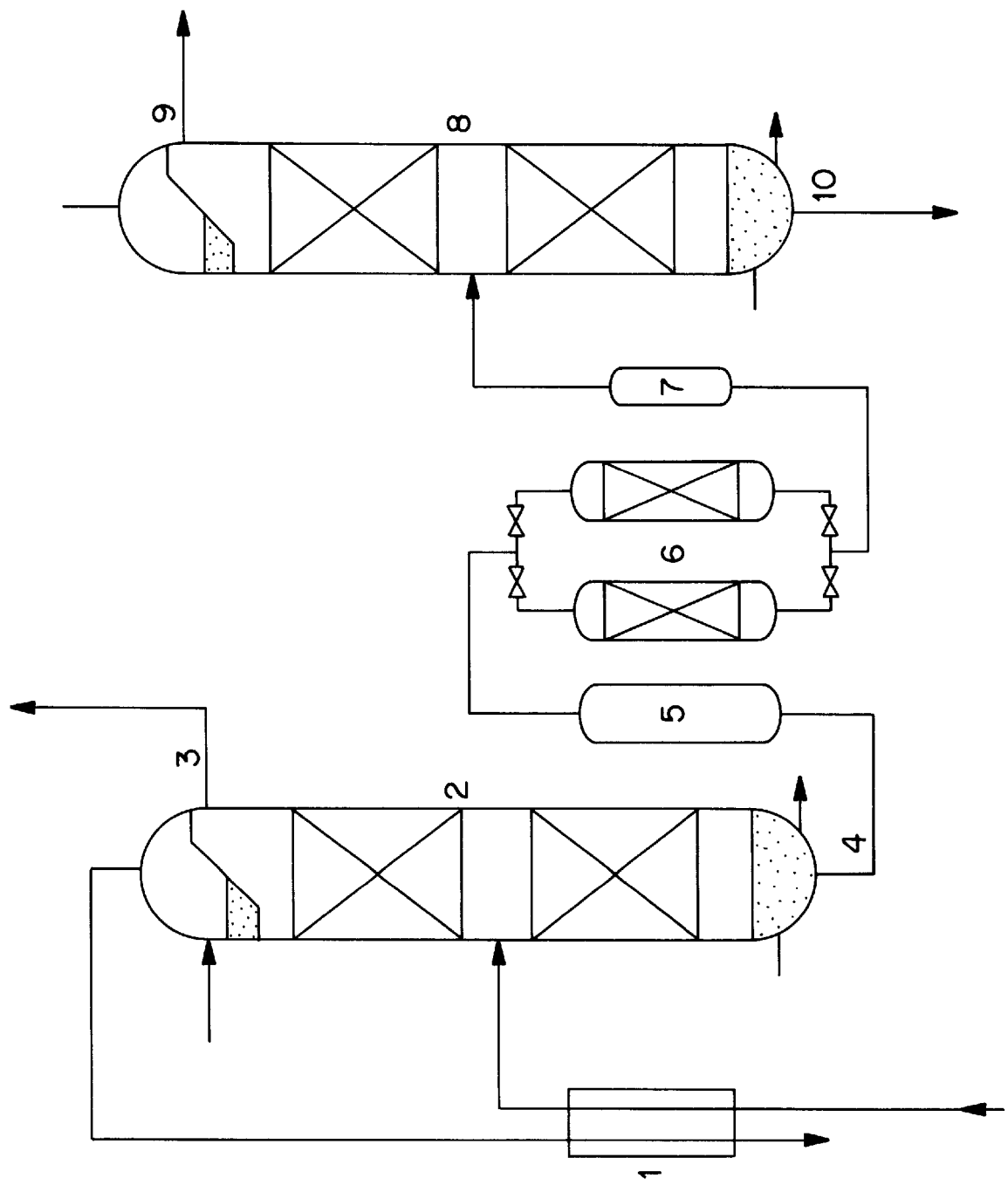

PROCESS FOR KRYPTON AN XENON EXTRACTION

SUMMARY OF THE INVENTION

The invention relates to a process for extracting krypton and/or xenon. For example, in a low-temperature air separation unit, krypton and xenon can be concentrated into a krypton-xenon concentrate, and krypton and/or xenon can then be extracted from the krypton-xenon concentrate by means of distillation.

The noble gases krypton and xenon that occur in the air at a content of approximately 1 ppm of Kr and 0.09 ppm of Xe are extracted by treating considerable amounts of air in air separation units. The boiling points of krypton and xenon are, respectively, approximately 120 K and 165 K, i.e., far above the boiling temperatures of nitrogen, oxygen, and other noble gases. Therefore, in the commonly used double-column rectifiers, krypton and xenon accumulate together with various hydrocarbons in liquid oxygen. Double-column rectification systems are well-known within the art. See, e.g., *Encyclopedia of Industrial Chemistry* (1988), Vol. B3: Unit Operations II, pages 20–32 to 20–40.

For Kr/Xe extraction, a portion of the liquid oxygen that is enriched with Kr/Xe is removed from the main condenser of a double-column rectification system and directed to a krypton concentration column. A krypton-xenon concentrate, which contains about 1 vol. % Kr, about 0.5 vol. % hydrocarbons, and 0.1 vol. % Xe, is then obtained from the krypton concentration column. The main component of the krypton-xenon concentrate is oxygen.

The maximum concentrations of Kr and Xe are determined by the ignition limits of the hydrocarbons that remain in the concentrate, especially that of methane. Owing to their low volatility, the hydrocarbons are also concentrated in liquid oxygen upon rectification. When the ignition limit, which in the case of methane is approximately a content of 5 vol. % of methane, is exceeded, the hydrocarbons form an explosive mixture in the presence of oxygen. Thus, to insure that no hazardous methane concentrations are produced, even in the case of local concentrations, malfunctions or unit shut-down, a safety factor of at least 10 is allowed for in practice, i.e., the methane content is limited to a maximum of 0.5 vol. %.

The concentrate that is obtained from the krypton concentration column is typically evaporated under supercritical pressure, heated to about 500° C., and run through a catalyst, whereby the hydrocarbons are decomposed into water vapor and carbon dioxide. The water vapor and carbon dioxide can then be removed from the resultant concentrate by means of molecular sieves. Then, the oxygen is removed in another distillation column, and a highly concentrated krypton-xenon concentrate is extracted. In a subsequent krypton-xenon rectification step, krypton is drawn off from the top of the rectification column and pure, krypton-free xenon is drawn off from the bottom.

In the above-described extraction of krypton and xenon in low-temperature air separation units, Kr and Xe are concentrated by a factor of approximately $10^6$ or $10^8$. In this case, trace contaminants in the air are also concentrated. These include primarily greenhouse gases such as $CF_4$, $CFCl_3$, $CF_2Cl_2$, $C_2F_6$, and $SF_6$.

Fluorine- and chlorine-containing hydrocarbons or chlorofluorocarbons (CFCs) are thermally very stable. Thus, for example, thermal decomposition of $CF_4$ occurs at atmospheric pressure only at temperatures of above 900° C. The decomposition temperature can be reduced by a catalyst, but the degradation of fluorocarbons causes the catalyst to be damaged. In the case of the low-temperature air separation unit, the adsorptive removal of CFCs previously proved to be unsuitable since the known molecular sieves adsorb CFCs only poorly and, moreover, damage the adsorber.

Krypton and xenon therefore contain measurable amounts of contaminants, which previously could not be removed by catalytic decomposition or adsorption. An object of this invention is therefore to provide a process of the above-mentioned type that makes it possible to extract extremely pure krypton and/or xenon from which especially fluorine- and/or chlorine-containing contaminants, such as fluorocarbons, $CF_4$ and $SF_6$, are removed.

Upon further study of the specification and appended claims, further objects and advantages of this invention will become apparent to those skilled in the art.

According to the invention, these objects are achieved in that by purifying a krypton-xenon concentrate, a krypton stream, and/or a xenon stream using a solid sorbent that contains phyllosilicates, whereby fluorine- and/or chlorine-containing contaminants, especially fluorocarbons, $CF_4$ and/or $SF_6$, are removed from the krypton-xenon concentrate, the krypton stream and/or the xenon stream. The amount of phyllosilicates, within the sorbent is preferably at least about 10 wt. %, especially at least about 50 wt. %. Suitable phyllosilicate-containing sorbents are available from CS-GmbH Halbleiter-und Solartechnologie, Ismaning, Germany.

The stream to be treated with the phyllosilicate-containing sorbent preferably contains about 99.9 vol % krypton or about 99.9 vol. % xenon, or a combined krypton/xenon content of about 99.9 vol %, e.g., about 80% Kr and about 20% Xe.

The amount of fluorine and/or chlorine-containing contaminants in the stream to be treated by the phyllosilicate-containing sorbent is dependent on several factors, e.g., the total amount of fluorine and chlorinecontaining contaminants in the local air at the location of the plant. Preferably, the Kr/Xe stream to be treated contains less than about 100 ppm $CF_4$ and less than 100 ppm $SF_6$. Furthermore, the amount of $C_2F_6$ is preferably below 20 ppm.

The use of a sorbent that contains phyllosilicates is known from another technical specialty, namely the process for disposal of halogenated hydrocarbons, for example, CFC coolants from refrigerators, such as disclosed in DE-A-44 04 329. It has now been found, surprisingly enough, that a krypton-xenon concentrate, krypton and/or xenon such as extracted in a low-temperature air-separation unit with the extraction of noble gases can also be very readily purified with such a sorbent.

Before being purified by treatment with the phyllosilicate-containing sorbent, the Kr/Xe stream is preferably treated for removal of hydrocarbons, e.g., catalytic decomposition of hydrocarbons followed by removal of water vapor and carbon dioxide via molecular sieves. In any event, after catalytic decomposition and removal of water vapor and carbon dioxide, the amount of hydrocarbons present in the stream to be treated with the phyllosilicate-containing sorbent is preferably not more than about 20 ppb.

According to the invention, a concentrated krypton-xenon concentrate, a krypton product stream extracted after distillation and/or a xenon product stream extracted after distillation are directed through a sorbent that contains phyllosilicates.

In this sorbent, fluorine- or chlorine-containing contaminants that are in krypton, xenon, or mixtures thereof are bonded by cheinisorption. In particular, the fluorocarbons that cannot be destroyed with conventional catalysts even at high temperatures and with high oxygen content, such as, e.g., $CF_4$, $CCl_2F_2$ or $CCl_3F$, as well as $SF_6$, are decomposed or permanently bonded. Fluorine-containing decomposition products that are produced in the sorbent during the chemical reaction are also permanently and irreversibly sorbed. The noble gas or noble gas mixture that exits from the sorbent is thus free of the fluorine and chorine compounds that previously could not be removed or could be removed only with difficulty.

Up until now, krypton end product streams were contaminated with up to 100 ppm of $CF_4$, and xenon end product stream were contaminated with up to 100ppm of $SF_6$. By using the process according to the invention, it is now possible to extract extremely pure end products.

Preferably, purification by contact with the phyllosilicate-containing sorbent preferably yields a product krypton stream, xenon stream, or combined krypton/xenon stream containing not more than about 1 ppm $CF_4$, and not more than about 1 ppm $SF_6$.

The removal of fluorine- and/or chlorine-containing contaminants can be done both with and without oxygen being present in the stream to be treated. But, preferably contaminant removal is performed on streams which have already undergone an oxygen separation step.

The amount of oxygen present within the stream to be treated is preferably not more than about 50 ppm, especially not more than about 1 ppm. If the stream to be treated contains $C_2F_6$, it is preferred that for each mole of $C_2F_6$ present there is at least about half a mole of oxygen present within the stream.

When fluorocarbons are chemically reacted in the sorbent, carbon dioxide is formed as a decomposition product. Traces of oxygen and water are also discharged from the medium of the sorbent. The krypton and/or xenon that exits from the sorbent is therefore contaminated with carbon dioxide, water, and oxygen. Suitably, therefore, after purification in the sorbent, water, carbon dioxide, and/or oxygen are again removed from the krypton-xenon concentrate and/or krypton and/or xenon to obtain extremely pure end products. For example, after contact with the phyllosilicate sorbent and subsequent removal of water, carbon dioxide and/or oxygen, the total amount of contaminants present within the resultant stream is preferably below about 10 ppm.

The removal of water and/or carbon dioxide is advantageously carried out by means of a molecular sieve adsorber. Generally two molecular sieve adsorbers are used. These adsorbers can be operated alternately, while one of which is being charged with carbon dioxide and water vapor the other is being regenerated. The molecular sieve adsorber that is active, i.e., that is to be charged, is suitably operated at a temperature that is slightly above the freezing point of water since at these conditions, the amount of water vapor in the air is minimal and therefore the amount of water vapor that has to be adsorbed is minimized. By minimizing the amount of adsorbed water vapor and carbon dioxide, the operating time, i.e., the time the molecular sieve can be charged without regeneration, can be extended.

The oxygen that is in the krypton, xenon, or krypton-xenon concentrate after purification according to the invention is preferably removed from the gas or gas mixture with use of an Ni—Cu contact. Oxygen removal by a Ni—Cu contact can be performed at any time after contact with the phyllosilicate-containing sorbents. For example, it can be performed before or after the removal of water vapor and/or carbon dioxide. However, oxygen is preferably removed after removal of water vapor and/or carbon dioxide.

An especially good purification effect is achieved when the krypton-xenon concentrate and/or the krypton and/or the xenon are purified via the phyllosilicate-containing sorbent at a pressure of preferably about 1 bar-10 bar, especially about 2–3 bar.

With respect to temperature range, it has proven advantageous to purify the krypton-xenon concentrate and/or the krypton and/or the xenon via the phyllosilicate-containing sorbent at a temperature of preferably about 300° C.–600° C., especially about 450° C.–550° C.

The purification according to the invention using the phyllosilicate-containing sorbent is preferably performed before the krypton-xenon concentrate is separated into krypton and xenon. As a result, fluorine- and chlorine-containing contaminants are removed from both the krypton and the xenon in a single purification step. Thus, it is not necessary to design all of the devices that are needed for purification according to the invention to be dual-purpose devices.

However, it may also be advantageous to purify, in accordance with the invention, the individual products, krypton and xenon, rather than purifying the concentrated mixture of the two noble gases. In the purification of the concentrated mixture, different substances, such as $CF_4$ and $SF_6$, are bonded in the sorbent. If the sorbent is saturated for one of these substances, e.g., $CF_4$, the sorbent must be completely replaced even if it could still take up other contaminants, e.g., $SF_6$. When individual products are purified after krypton-xenon separation, however, basically only $CF_4$ is removed from krypton and $SF_6$ is removed from xenon. In this case, the individual sorbents can be specifically designed so that the uptake capacity of the sorbent can be exploited to its fullest.

BRIEF DESCRIPTION OF THE DRAWING

Various other features and attendant advantages of the present invention will be more fully appreciated as the same becomes better understood when considered in conjunction with the accompanying drawing, which illustrates a portion of a process diagram of an air separation unit with krypton and xenon extraction.

In the foregoing and in the following examples, all temperatures are set forth uncorrected in degrees Celsius; and, unless otherwise indicated, all parts and percentages are by weight.

The entire disclosure of all applications, patents and publications, cited above and below, and of corresponding German application No. 19708780.9, filed Mar. 4, 1997, is hereby incorporated by reference.

DETAILED DESCRIPTION

The krypton-xenon concentrate that is extracted from a krypton concentration column (not shown) is heated to approximately 500° C. and run through a noble metal combustion catalyst (not shown), which brings about the complete destruction of the methane that is in the concentrate. The products, water and carbon dioxide, produced in this decomposition reaction are then adsorbed in a molecular sieve adsorber(s) (not shown).

The krypton-xenon concentrate is then cooled in a heat exchanger 1 and fed to a first krypton column 2. Oxygen has a lower boiling point than krypton and xenon and can therefore be drawn off at the head 3 of column 2. A highly concentrated, largely oxygen-free krypton-xenon mixture, which, however, is charged with trace amounts of air contaminants, such as $CF_4$ or $SF_6$ that could not be removed by the upstream catalysts and adsorber and were also concentrated, is obtained from the bottom 4 of krypton column 2.

The krypton-xenon concentrate removed from column 2 is then fed to a sorbent 5, which contains at least 10%, and preferably more than 50%, phyllosilicates. The contaminants that are contained in the concentrate are irreversibly bonded to sorbent 5 by chemisorption. The reaction takes place at a pressure of, for example, about 2–3 bar, especially at about 2.5 bar. The temperature is, for example, selected between about 450° C.–550° C., preferably up to 500° C. In sorbent 5, all remaining contaminants are removed from the concentrate.

During the chemical reactions in sorbent 5, however, carbon dioxide is produced as a decomposition product. Water vapor and oxygen are also present in the stream exiting from sorbent 5. To remove carbon dioxide and water, the krypton-xenon concentrate removed from sorbent 5 is directed through a molecular sieve adsorber stage 6. As shown in the figure, these adsorber stage 6 preferably has two molecular sieve adsorbers that operate alternately, i.e., one is being charged while the other is being regenerated.

The regeneration of molecular sieve adsorber 6 is preferably accomplished with oxygen. After regeneration, molecular sieve adsorber 6 is emptied into a gas balloon flask (not shown) and evacuated. The gas that is collected in the gas balloon flask is recycled into the air separation process, so that losses during regeneration, especially krypton and xenon losses, are minimized.

The concentrate from the molecular sieve adsorber is then sent to a Ni—Cu contactor 7, wherein residual traces of oxygen are removed from the krypton-xenon concentrate by oxidation. The purified concentrate removed from contactor 7 is then fed into another rectification column 8. An extremely pure krypton product stream can be drawn off from the top 9 of column 8 and an extremely pure xenon can be drawn off from the bottom 10 of column 8.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. In a process for extracting krypton, xenon, or both in a low-temperature air separation unit, wherein krypton and xenon are concentrated in a krypton-xenon concentrate, and a krypton stream, a xenon stream, or both are extracted from the krypton-xenon concentrate by means of distillation, the improvement comprising:

contacting at least one of the krypton-xenon concentrate, the krypton stream and the xenon stream with a solid sorbent containing phyllosilicates to remove fluorine-containing contaminants, chlorine-containing contaminants or both from the krypton-xenon concentrate, the krypton stream, the xenon stream, or a combination thereof.

2. A process according to claim 1, wherein after contact with said solid sorbent, water, carbon dioxide, oxygen or combinations thereof are removed from the krypton-xenon concentrate, the krypton stream, the xenon stream, or a combination thereof.

3. A process according to claim 2, wherein removal of water, carbon dioxide, or both is performed by means of a molecular sieve adsorber.

4. A process according to claim 1, wherein said contacting step is performed at a pressure of between 1 bar–10 bar.

5. A process according to claim 4, wherein said contacting step is performed at a pressure of between 2 bar–3 bar.

6. A process according to claim 2, wherein said contacting is performed at a pressure of between 1 bar–10 bar.

7. A process according to claim 6, wherein said contacting is performed at a pressure of between 2 bar–3 bar.

8. A process according to claim 3, wherein said contacting is performed at a pressure of between 1 bar–10 bar.

9. A process according to claim 8, wherein said contacting is performed at a pressure of between 2 bar–3 bar.

10. A process according to claim 1, wherein said contacting is performed at a temperature of 300° C.–600° C.

11. A process according to claim 10, wherein said contacting is performed at a temperature of 450° C.–550° C.

* * * * *